No. 609,256. Patented Aug. 16, 1898.
W. L. WYLLIE.
TELEMETER OR RANGE FINDER.
(Application filed Dec. 28, 1897.)
(No Model.)
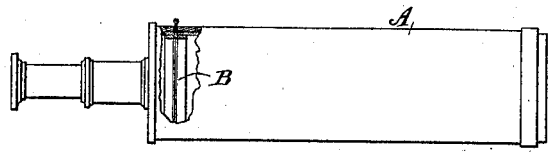
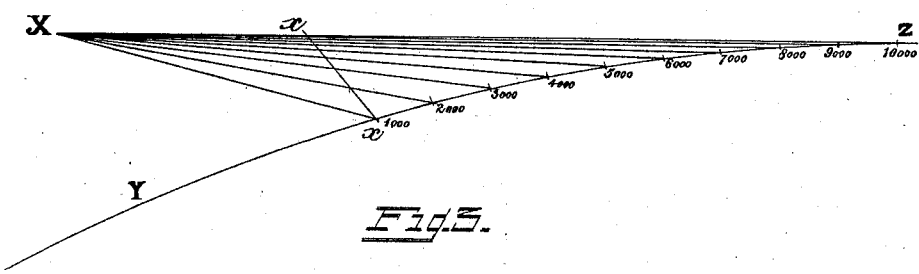
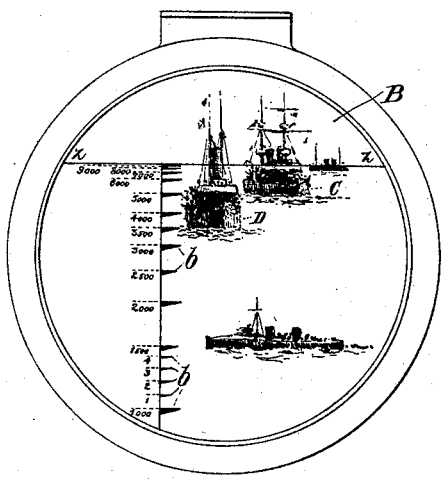
WITNESSES:
INVENTOR.
William Lionel Wyllie.
Per Robert E. Phillips.
Attorney.
THE NORRIS PETERS CO., PHOTO-LITHO., WASHINGTON, D. C.

UNITED STATES PATENT OFFICE.

WILLIAM LIONEL WYLLIE, OF HOO ST. WERBURGH, ENGLAND.

TELEMETER OR RANGE-FINDER.

SPECIFICATION forming part of Letters Patent No. 609,256, dated August 16, 1898.

Application filed December 28, 1897. Serial No. 664,152. (No model.) Patented in England January 4, 1897, No. 196.

*To all whom it may concern:*

Be it known that I, WILLIAM LIONEL WYLLIE, A. R. A., a subject of the Queen of Great Britain, residing at Hoo St. Werburgh, near Rochester, in the county of Kent, England, have invented a new and useful Improved Telemeter or Range - Finder, (for which I have obtained Letters Patent in Great Britain, No. 196, bearing date January 4, 1897,) of which the following is a full and complete specification.

This invention relates to a new or improved telemeter or range-finder, and has for its object the production of an instrument not liable to get out of order, more accurate than those now in use, cheap to manufacture, and above all requiring no calculation or adjustment, showing at a glance the desired range. It may therefore be used by unskilled persons.

A telemeter or range - finder constructed according to this invention consists, essentially, of an ordinary terrestrial telescope having a specially graduated or scaled screen interposed between the object-glass and the eyepiece.

In the accompanying drawings, which illustrate one form my invention may assume, Figure 1 is a view in side elevation, partly in section, of an ordinary terrestrial telescope adapted for use as a telemeter or range-finder. Fig. 2 is a diagrammatic view showing the principle involved in scaling or graduating the screen, and Fig. 3 is a view of the screen on an enlarged scale.

The principle involved in the construction of a telemeter or range-finder according to this invention is as follows: The distance from a given point above the level of the sea to the horizon is a constant and known quantity and the water-line of any object which is visible appears to approach the line of the horizon according to its distance from the observer.

In carrying this principle into effect I construct or adapt an ordinary telescope A in such a manner as to allow of a specially scaled or graduated screen B to be inserted and held between the object-glass and the eyepiece, and also provide means whereby the distance between the said screen B and the object-glass is made constant or unalterable. The usual erector or combination of lenses used in terrestrial telescopes for reversing the image is placed either in the eyepiece or between the screen and the object-glass. The eyepiece is of the usual construction.

I prefer to so construct my telemeter or range-finder that the screen may be readily inserted, either by forming a slot in the tube, as shown on the drawings, or by securing it in place from the eyepiece end by a screwed ring in a manner similar to that employed for securing the lenses in position, so as to allow of differently marked or graduated screens being employed. The screen is preferably made of glass; but it may be made of other transparent or semitransparent material, and to insure the best results should be optically worked or have both its surfaces true and parallel with each other.

The scale or divisions $b$ marked on the screen, as shown in Fig. 3, may be formed thereon in any suitable manner, but preferably by means of photography.

The relative positions or the distances apart of these division-marks are arrived at in a manner which will be clear on reference to Fig. 2, wherein Y Z represents a segment of the earth's surface, X the eye of the observer, and X Z the horizontal line.

The distance between the eye of the observer X and the earth's surface Y is equivalent to the height above the level of the sea at which the instrument is to be used. If the line Y Z is now divided into equal divisions—say of one thousand yards each, as shown—then lines drawn from these points to the eye of the observer will intersect a radial line $x\ x$, and the points at which these lines intersect will furnish the data from which the screen may be scaled or graduated. It will be understood that each division may be subdivided in a similar manner into as many parts or distances as may be found desirable, and also that a separately scaled or graduated screen is required for each height above sea-level at which the instrument is to be used. For instance, in a telemeter for naval use the height of the ship's bridge above the sea-level would be used for determining the scale of one screen and the height of the conning-tower for another screen.

In using this telemeter or range-finder the observer makes the top horizontal line $zz$ on the screen coincide with the horizon and reads off the distance shown by that mark or line on the screen which corresponds with the water-line of the vessel or other object whose range or distance he wishes to ascertain. For instance, in Fig. 3 of the accompanying drawings the water-line of the ironclad C is shown coinciding with the mark "5000." Its range or distance from the observer is therefore five thousand yards. Similarly the cruiser D is at a range or distance of three thousand five hundred yards, and so on.

When the telemeter or range-finder is used from a fort or like structure, it will be possible to mount it on a turn-table fitted with a depression-ring, so as to enable it to be used even when the horizon is obscured by fog or darkness.

What I claim, and desire to secure by Letters Patent, is—

A telemeter or range-finder consisting of a telescope having a graduated or scaled transparent or semitransparent screen interposed between the object-glass and the eyepiece, such screen being so scaled or graduated for the height at which it is to be used as to enable the observer to ascertain the distance of an object which is visible by measuring the distance from the horizon to the water-line of the object, as set forth.

WILLIAM LIONEL WYLLIE.

Witnesses:
A. MILLWARD FLACK,
W. M. HARRIS.